July 7, 1970 W. K. BERTHOLD 3,519,349

IMAGE CORRELATION DEVICE

Filed April 12, 1966 2 Sheets-Sheet 1

INVENTOR.
WOLFGANG K. BERTHOLD
BY Edward Goldberg
ATTORNEY

July 7, 1970 W. K. BERTHOLD 3,519,349

IMAGE CORRELATION DEVICE

Filed April 12, 1966 2 Sheets-Sheet 2

INVENTOR.
WOLFGANG K. BERTHOLD

BY Edward Goldberg

ATTORNEY

United States Patent Office 3,519,349
Patented July 7, 1970

3,519,349

IMAGE CORRELATION DEVICE

Wolfgang Karl Berthold, Fort Wayne, Ind., assignor to International Telephone & Telegraph Corporation, Nutley, N.J., a corporation of Delaware Filed Apr. 12, 1966, Ser. No. 542,143
Int. Cl. G01c *3/08*; G01b *11/24*
U.S. Cl. 356—4 6 Claims

ABSTRACT OF THE DISCLOSURE

An image correlation device includes a semiconductive layered panel having a non-linear resistance varying inversely with light or electron beam impingement. The panel includes two such layers positioned between two energy sources to simultaneously receive energy therefrom onto opposite sides thereof. Substantial current flow is permitted only through discrete areas of the two layers at which the two images from opposite sides coincide, with means provided for measuring current flow varying in accordance with such coincidence and the intensity distribution of the images.

This invention relates to image comparison devices and particularly to a novel semiconductive panel which correlates the response to light from two images projected onto the panel.

Prior art image correlation devices have utilized an image tube having a storage mesh which stores a previously viewed image in the form of a charge pattern and compares this to an incoming optical image projected onto a photocathode. The photocathode emits an electron beam having a density distribution in accordance with the light intensity of the incoming optical image. The electron beam is scanned over the storage mesh in a well known manner. Passage of electrons through the mesh is dependent upon the stored charge pattern and a maximum output is obtained when the two images most closely coincide. A more detailed discussion of such a device may be found in copending application Ser. No. 465,922, filed June 22, 1965 and assigned to the same assignee as the instant application. Other devices for similar purposes have utilized a plurality of masked targets having apertures of different known shapes which can be compared with an incoming image configuration carried by an electron beam, or film techniques which compare light and dark areas of two different filmed scenes. These devices have the disadvantage of requiring complex structures and equipment which are capable only of comparing presently viewed objects with previously stored images. In many situations it is desirable to compare two images simultaneously without requiring storage and to provide a simplified structure for accomplishing this result.

It is therefore the primary object of the present invention to provide a novel simplified image correlation device which can compare image signals from two different energy sources projected onto the device at the same time.

Figures 1, 2, 5:
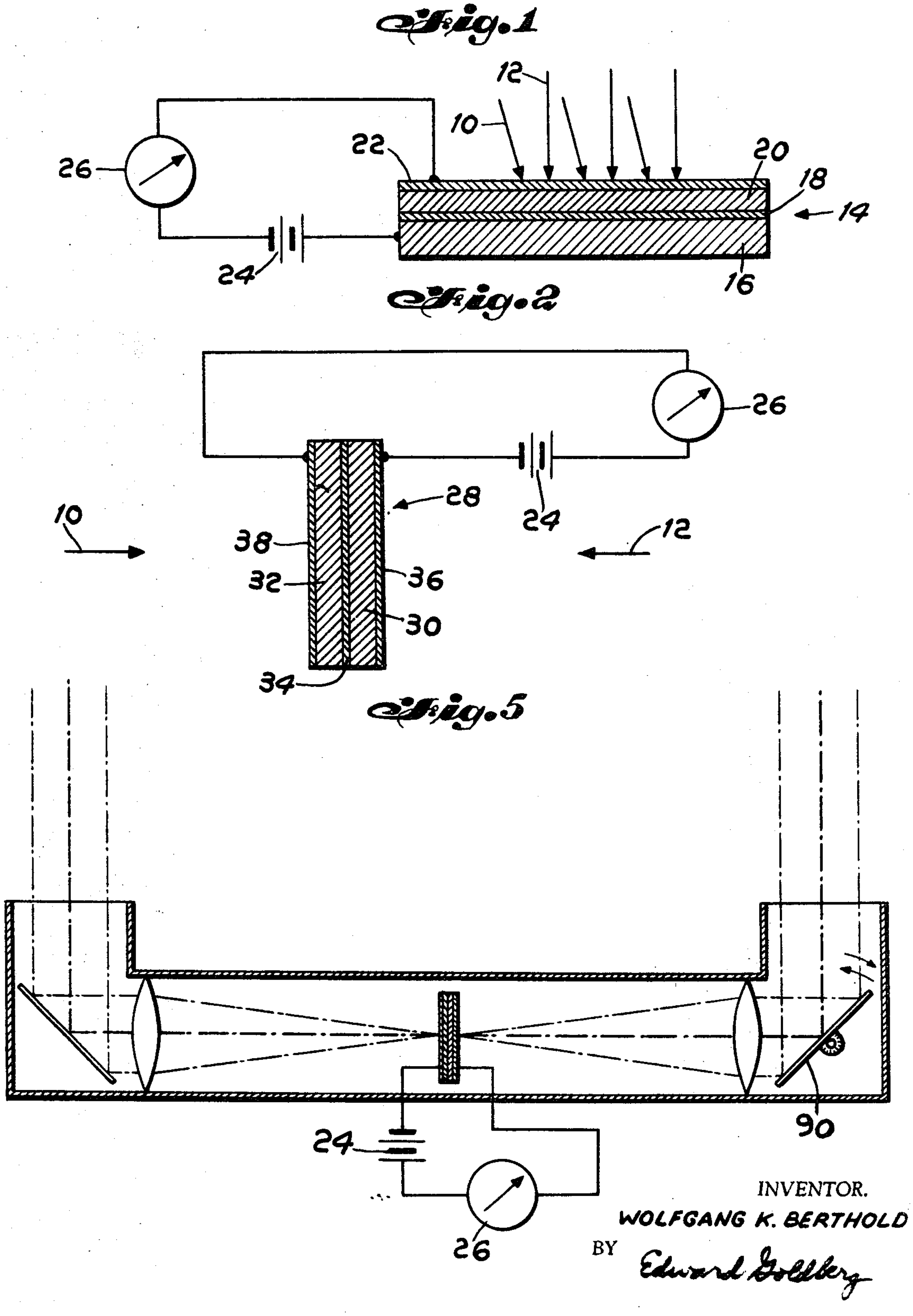
Figure 3:
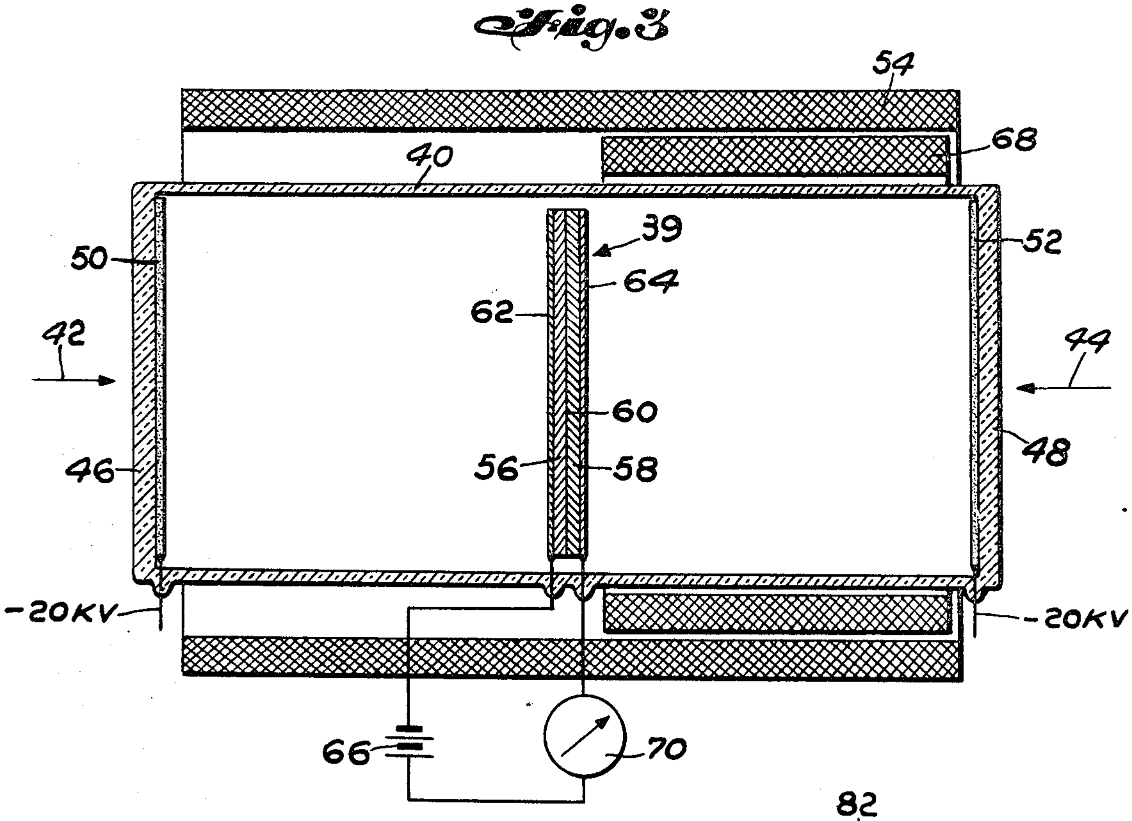
Figure 4:
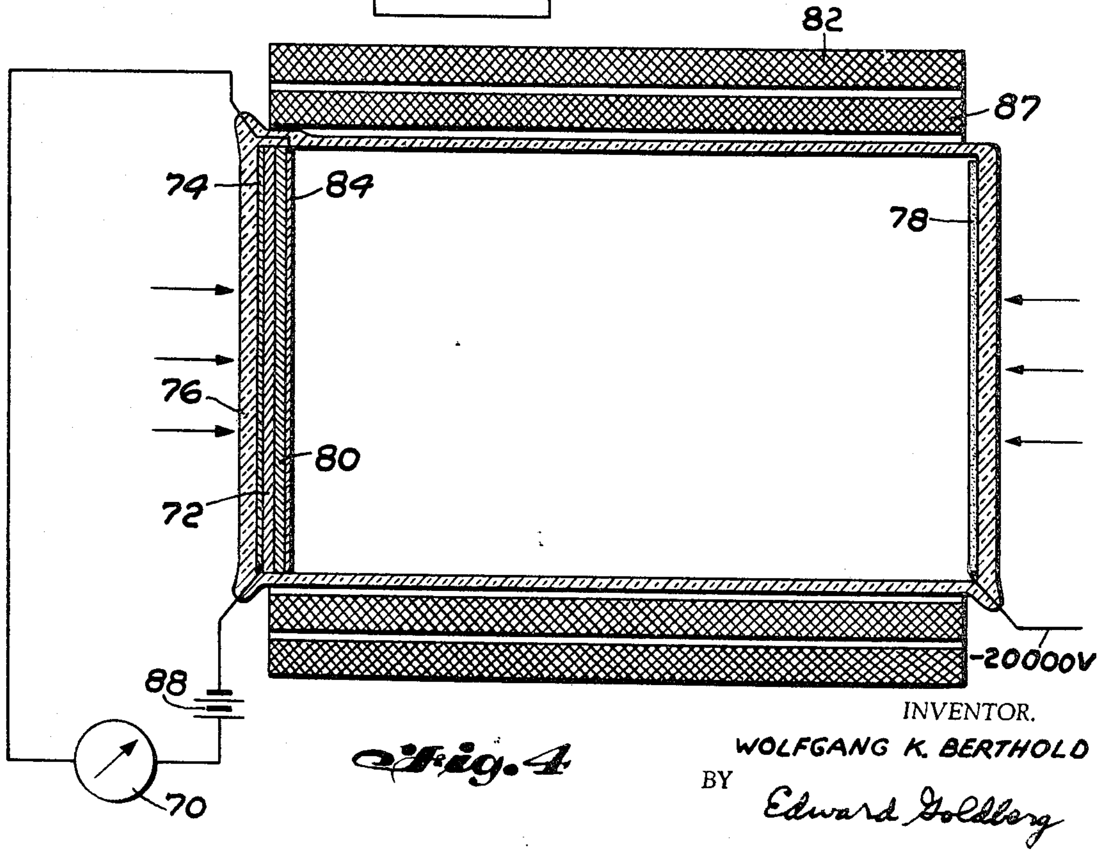

This result is achieved by utilizing a novel semiconductive panel arrangement having elemental areas which form a non-linear resistance varying inversely with the light or electron beam impinging thereon. As is well known, photoconductive materials provide high resistance in areas where no light impinges and a low resistance in the light path. Other materials provide similar characteristics in response to electron bombardment. An image pattern is thus formed having a specific intensity distribution. With a source of voltage applied across the panel, the resultant total current therethrough can measure the degree of correlation between the two images. The details of the invention will be more fully understood and other objects and advantages will become apparent in the following description and accompanying drawings wherein:

FIG. 1 shows one form of the novel correlation device for comparing images projected onto one side of the panel, FIG. 2 shows another variation of the device for comparing images on opposite sides of the panel, FIG. 3 shows a panel mounted in a tubular envelope, FIG. 4 shows a further variation of a panel in a tubular envelope, and FIG. 5 shows a range finding system in which a correlation panel may be employed.

As shown in FIG. 1, two optical images, indicated by arrows 10, 12 are directed at the same side of panel 14, which includes a conductive substrate 16, a resistive layer 18, a photoconductive layer 20 and an outer transparent conductive layer 22. The two outer conductors on each side of the panel are connected to a direct voltage source 24 and an ammeter 26 is shown measuring current through the panel with the two images focused on the photoconductive layer. The current will be seen to vary as the images are shifted with respect to one another, with a minimum current resulting when light and dark areas of the two superimposed images are most closely in correspondence. This is due to a saturation effect wherein the current through one discrete area of the photoconductor will not increase further with increasing brightness. Thus, in this configuration, two separate bright areas in parallel paths reduce the resistance of the photoconductive material and increase current to a greater extent than two superimposed bright areas. The metal substrate 16 may be formed of high resistance glass having a layer of tin oxide, copper, chromium or other suitable conductor deposited thereon. The resistive layer 18 may be formed of a carbon filled lacquer for example, while the photoconductive layer 20 may include cadmium sulfide, antimony trisulfide, selenium, zinc sulfide, silicon, germanium or other suitable semiconductive materials. The outer transparent conductor may be a thin layer of gold, indium or tin oxide, for example.

While the arrangement of FIG. 1 is quite simple, current minimum and maximum readings between matching and mismatching image patterns may vary by only a few percent up to a limit of 50 percent, which necessitates having a very uniform response over the area. An improved panel can be formed by employing two photoconductive layers, one over the other, with an interface therebetween to prevent optical coupling or transfer of mobile charge carriers, including electrons or holes, from one layer to another. In this case, as shown in FIG. 2, current through panel 28 will be very small with a bright image element appearing on one side and a dark portion on the opposite side at the same relative position, since the dark layer maintains a high series resistance. Only when two bright elemental areas are in coincidence on opposite sides of the panel will a large increase in current occur. Thus, a greater sensitivity and dynamic range are achieved in this configuration with a maximum current being obtained when the intensity distribution of the image patterns on each side match most closely.

Single crystal semiconductor light sensors have a somewhat different voltage-current relationship, in that current is proportional to light but over a wide range is independent of the voltage applied. The current through the two light sensors in series is dependent upon the one receiving the lower light flux. However, correlation can be performed if the charge carriers are limited to the layer in which the carrier was generated. With two different materials such as silicon and germanium, a heterojunction is formed having sufficient lattice disturbances at the interface to generate a zone of very short lifetime for carriers. Silicon oxide or suitable impurities may also be utilized to form this interface. The two layers 30, 32 may be formed of opposite type P and N conductivity semiconductor material with the interface 34 therebetween having the required high degree of lattice disturbance and short lifetime of excited carriers. The elemental response characteristic of the panel is similar to that of two reverse biased photosensitive silicon diodes in series, wherein current increases proportionately with light from a first source directed on one diodes until it reaches a current on the second diode determined by a second light level. The current level thereafter remains constant. A reverse bias potential is applied between the two conductive coatings 36, 38 to provide a depletion layer or field in the semiconductors which is sensitive to radiation and can absorb photons. The device has a relatively high resistance since the majority charge carriers are removed from both semiconductor layers. Activation by light thereafter reduces the resistance of the respective layer.

The semiconductor doping preferably should have such a profile that with changing potential across the panel very little change in the extension of the depletion layer occurs. This can be achieved with a bulk material of high resistivity with a high rise of impurity concentration at both surfaces. Diffusion of suitable doping material into the bulk semiconductor at the surface can provide the desired effect. The thickness of the semiconductor layers is such that the radiation coming from the surface is absorbed substantially completely in one layer with negligible amounts penetrating the second semiconductor. The thickness may be 100 micrometers for layers 30 and 32 and the wavelength of the light in the spectral range used may be between 0.4 to 0.6 micrometer. The charge carrier photoelectrons or holes follow the field in the depletion layer but do not penetrate the opposite layer because of the lattice disturbances at the interface between the two photoconductive layers. A small steady state electron current does flow through the panel between the two outer conductive layers but photoelectrons are not passed until both sides are illuminated at the same time and at similar relative positions. A high lateral resistivity also limits the conduction to a small area.

As shown in FIG. 3, a similar form of correlation panel 39 is mounted in an electron tube envelope 40. Light images 42, 44 are projected through transparent faceplates 46, 48 onto photocathode layers 50, 52 respectively, at each end of the tube. Photoelectrons are emitted in accordance with the intensity distribution of each image and are focused by focusing coil 54 onto each side of the panel. In this case electron bombardment sensitive layers 56, 58 are utilized in place of photoconductive material. Known insulator materials such as oxides of aluminum, selenium and lead exhibit the property of becoming conductive under electron bombardment. The interface 60 inherently forms a junction which inhibits current flow between the two layers except upon simultaneous bombardment by electrons at similarly positioned areas on each side. A thin aluminum coating 62, 64 on each side, forms electron transparent conductive layers which are connected to a suitable source of direct voltage 66. Relative displacement between the two images is provided by deflecting coils 68 which scan the image entering at one side of the tube across the panel for comparison with the image projected onto the other side. An ammeter 70 records the maximum correlation current to determine coincidence of the images. Typical voltages may be 50 volts supplied by source 66 and —20 kilovolts on each photocathode.

FIG. 4 shows a hybrid type panel incorporated in an electron tube. In this arrangement the layer 72 is formed of a photoconductive material such as antimony trisulfide, lead ovide or silicon with a transparent coating 74 of tin oxide adjacent the faceplate 76 at one end of the tube. The other end of the tube has a photocathode layer 78 which converts the light image into an electron beam focused onto layer 80 by coils 82. Layer 80 is formed of a material conductive under electron bombardment such as aluminum oxide and has a thin opaque outer metal coating 84 such as aluminum, to permit entry of electrons while blocking light. Layer 72 is subjected directly to the light image on the other side. An interface between the two materials again prevents conduction between the two sides during exposure to light except upon coincidence of discrete portions of the images thereon. Deflection coils 87 provide scanning of the electron beam. The potential on the photocathode 78 may be about —20 kilovolts while a 50 volts potential is applied across the panel by direct voltage source 88.

FIG. 5 shows a passive optical range finder system which may employ the novel correlation panel of the invention. A rotating prism or mirror 90 is provided in the optical path of one image to follow the relative motion with respect to a fixed image of the target projected onto the other side. With a known distance between mirrors, the angle of rotation may be calibrated in distance to the target, at the point at which a maximum correlation current is recorded.

It may thus be seen that the present invention provides a novel simplified image correlation panel which can compare two simultaneously occurring images. While several embodiments have been illustrated, it is apparent that the invention is not limited to the exact forms or uses shown and that many other variations may be made in the particular design and configuration without departing from the scope of the invention as set forth in the appended claims.

What is claimed is:

1. An image correlation device comprising:

a first energy source projecting an image having a pattern characterized by a first given intensity distribution, a second energy source projecting a second image having a pattern characterized by a second given intensity distribution, a plurality of superimposed conductive and semiconductive layers positioned between said sources to simultaneously receive energy therefrom respectively onto opposite sides thereof including a first layer of semiconductive material having a non-linear resistance which changes from a high to low resistance state in discrete areas in accordance with the intensity of energy directed onto said layer from one said source and a second layer of semiconductive material disposed on the opposite side of said first layer to receive said energy from said second source and having a current inhibiting interface between said first and second layers, said interface normally preventing conduction therethrough of charge carriers responsive to said energy sources and permitting carrier flow only through discrete areas of the two layers at which the two images from opposite sides coincide.

a transparent conductive coating disposed on said opposite sides of each said layer, means applying a voltage across said opposite sides of said layers, and current sensing means for detecting the coincidence of said two images, said current means being connected to said opposite sides and measuring the total current flow through said layers, said current flow varying in accordance with the coincidence of the position and intensity distribution of said two images on said layers.

2. The device of claim 1 wherein said first and second layers are formed of photoconductive material and said energy sources project light images thereon, said transparent coatings permitting said light images to pass therethrough.

3. The device of claim 1 wherein said first and second layers are formed of electron bombardment sensitive material and said energy sources produce light images, including means mounting said layers in a vacuum enclosure, photocathode means at each end of said enclosure converting said light images into corresponding electron beams, means focusing said beams respectively onto said opposite sides of said layers, said transparent conductive coatings permitting electron flow therethrough while blocking light, and means for scanning one of said beams across one side of said layers.

4. The devices of claim 1 wherein one layer is formed of photoconductive material and the other layer of electron bombardment sensitive material, said energy sources projecting light images therefrom, means mounting said layers in a vacuum enclosure, said photoconductive layer being mounted at one end of said enclosure for exposure to one of said light image sources, photocathode means at the other end of said enclosure converting light from the other image source into a corresponding electron beam, the conductive coating adjacent said one layer being transparent to light and the conductive coating adjacent said other layer being transparent to electrons, and means focusing and scanning said electron beam onto and across said electron bombardment sensitive layer.

5. The device of claim 2 including reflecting means spaced at a predetermined distance from each side of said layers for directing light thereon.

means for moving one of said reflecting means to scan one image across one said layer, means for calibrating the movement of said reflecting means at the point of maximum total current to determine the distance to said light source.

6. The device of claim 1, wherein said interface has a relatively high degree of lattice disturbances and short lifetime of excited carriers.

References Cited

UNITED STATES PATENTS

| | | | |
|---|---|---|---|
| 2,150,159 | 3/1939 | Gray | 338—17 |
| 2,687,484 | 8/1954 | Weimer | 338—17 |
| 2,732,469 | 1/1956 | Palmer | 338—17 |
| 2,406,139 | 8/1946 | Fink et al. | |
| 2,890,359 | 6/1959 | Heiune et al. | |
| 3,059,522 | 10/1962 | Owens | 88—2.4 |
| 3,296,920 | 1/1967 | Goldfischer. | |

RONALD L. WIBERT, Primary Examiner

J. ROTHENBERG, Assistant Examiner

U.S. Cl. X.R.

356—168